July 12, 1932.  W. VAN B. ROBERTS  1,867,232
WIRELESS RECEIVING SYSTEM
Filed Nov.19, 1928

Inventor
WALTER VAN B. ROBERTS
By his Attorney

Patented July 12, 1932

1,867,232

UNITED STATES PATENT OFFICE

WALTER VAN B. ROBERTS, OF PRINCETON, NEW JERSEY, ASSIGNOR TO RADIO CORPORATION OF AMERICA, A CORPORATION OF DELAWARE

WIRELESS RECEIVING SYSTEM

Application filed November 19, 1928. Serial No. 320,357.

It is known that when a radiogoniometer is connected to two frame aerials as in a Bellini aerial, that direction of signals can be found by rotating the moving coil which is connected to a suitable receiver.

It is also known that, by connecting a common pair of frame aerials of the Bellini type to a plurality of radiogoniometers, signals from two or more stations located in different directions with respect to the receiving station may be received on the common aerial irrespective of what their wave lengths may be.

Apparatus of this nature known heretofore has many disadvantages, the main one of which is that considerable interference between signals is encountered in the aerial circuit and receiving circuits associated therewith.

Another disadvantage attendant on heretofore known apparatus of this nature is that when one of the receiving circuits is tuned it being for efficient operation closely coupled to the aerial circuit, reacts therethrough on the other receiving circuit so that the last named circuit is detuned with respect to the desired signals.

In copending application No. 320,356, filed November 19, 1928, a novel arrangement has been disclosed whereby a plurality of signals may be set up in a combining circuit and selected therefrom by means of a plurality of selecting circuits the entire apparatus being so arranged that signals at one frequency do not interfere with signals at other frequencies. Furthermore, this apparatus is so arranged and proportioned that tuning of one selecting circuit which is closely coupled to the combining circuit does not detune the other selecting circuits coupled thereto.

In the above mentioned application, the common circuit or combining circuit takes the form of a Wheatstone bridge arrangement in one arm of which the signals are impressed. The impedance of this arm may be composed of or associated with an inductance, or a frame aerial or a capacity, or any other known means by which energy may be impressed in the circuit. The other three arms of the bridge are each made up of passive impedances so chosen as to keep the bridge in balance at all frequencies within the desired range as fully set out in the aforementioned application. This may be effected by making one of the arms adjacent to the arm in which the voltage originates have an impedance whose ratio to the impedance of the voltage arm is independent of frequency. Likewise, the impedance ratio of the other two arms should be independent of frequency. Finally, the impedances should be such as to balance the bridge according to well known conditions. The signals are taken off by selecting circuits associated with the diagonals of the bridge circuit.

It will be apparent that since the diagonals are connected to nodal points on the bridge, tuning one of the selecting circuits or the diagonal associated therewith, will not cause a voltage change in the other diagonals of the bridge nor in the selecting circuit associated therewith. Accordingly, each diagonal or its associated circuit may be responsive to a different signal frequency and it will be apparent that signals set up in one selecting circuit will be free of cross talk and interference caused by signals set up in another selecting circuit, and furthermore, that tuning one selecting circuit will not affect the tune of another selecting circuit.

According to the present invention, a pair of these bridge circuits, an arm of each of which takes the form of a frame aerial of the Bellini type are utilized to receive a plurality of signals from different stations without interference between signals. This is accomplished by using one diagonal of each of the bridge circuits as one of the field windings of a pair of radiogoniometers the search coils of each of which are connected to a receiver circuit. It will be apparent from the previous description of my novel combining circuit that the signals in one of the receiving circuits will not interfere with the signals in the other receiving circuit, and that tuning of one of the receiving circuits will not detune the other receiving circuits.

Although in the brief description given above and in the following detailed description, I have described my novel arrangement as operating as a receiver system it will be understood that the device may be also used as a transmitter by using oscillation generators in place of the receiver devices shown and described.

The novel features of my invention have been pointed out with particularity in the claims appended hereto, however, a better understanding of the invention and the operation thereof will be had from the following detailed description and therefrom when read in connection with the accompanying drawing in which:

Figure 1 shows the bridge circuit used in my novel receiving system; while

Figure 1:
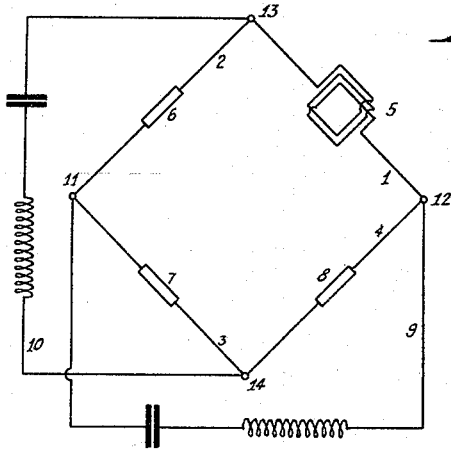

Referring to the drawing in Figure 1 thereof, there is shown a bridge circuit having arms 1, 2, 3 and 4 made up of impedances 5, 6, 7 and 8 respectively, as diagrammatically shown in the drawing. The impedance of one of the arms as, for instance, 1, takes the form of a frame aerial 5 into which signal energy may be impressed. By properly proportioning the impedance ratio of the arms 5, 6, and 7, 8 as fully set forth in the copending application above referred to, the bridge circuit can be balanced so that voltage impressed in the arm 5 will appear in the diagonals 9 and 10. The diagonals 9 and 10 connected across nodal points 11, 12 and 13, 14, respectively of the bridge are composed as shown in the drawings of tuned meshes comprising the desired combination of capacities and inductances.

It will be apparent that since the diagonals 9 and 10 are connected across the nodal points 11, 12 and 13, 14 respectively that each diagonal may be made to respond independently to its own signal frequency and that tuning of one diagonal will not react through the bridge circuit to affect the tune of the other diagonal or of the circuit associated therein.

Figure 2:
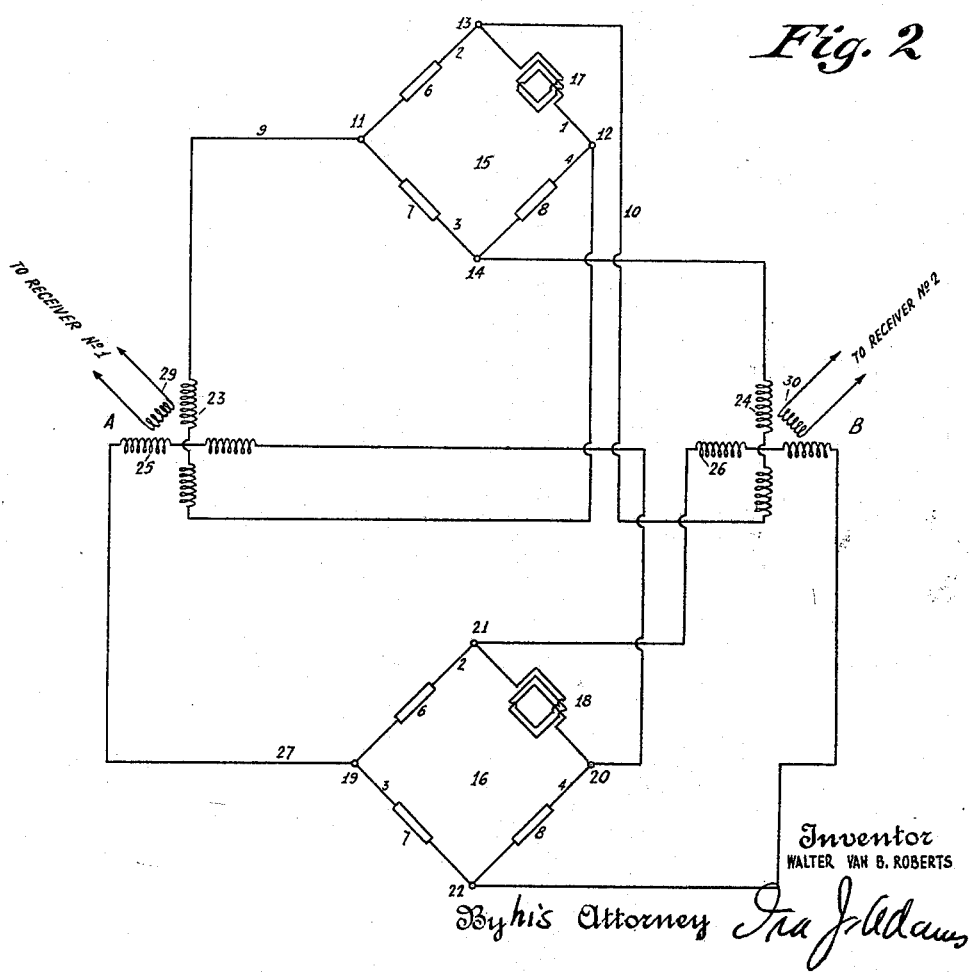
Figure 2 shows my novel receiving system.

A receiving circuit arranged in accordance with my invention comprises, as shown for purposes of illustration in Figure 2, a pair of bridges 15, 16, arranged to supply energy to a plurality of directional receiving sets. As shown in the drawing each of the bridge circuits 15 and 16 has in one arm thereof a frame aerial 17 and 18 respectively, which are fixed at right angles to each other on a common frame as is well known in the art and by means of which signals from a plurality of signalling stations may be simultaneously received.

By making the impedance ratio of the arm 6 of bridge 16 to the arm 17 and of the arm 7 to the arm 8 independent of frequency, the bridge will be so balanced that voltages set up in the frame aerial 17 will appear across the nodal points 11, 12 and 13, 14 but if a voltage is applied across the points 11, 12 it will not appear across the points 13, 14 and vice versa. Likewise in the bridge circuit 16 the signal voltages impressed in the frame 18 due to the balance of the bridge will appear across the nodal points 19, 20 and 21, 22 but if a voltage is applied across one of these pair of points it will not appear across the other pair of modal points.

Voltage oscillations at the frequencies of the received signals are set up in the bridge circuits and a portion of these voltages appears as pointed out above across the inductances in each of the diagonals of each of the bridge circuits. The inductance 23 in the diagonal 9 of the bridge circuit 15 forms one of the field windings of a radiogoniometer A the other field winding of which is formed by the inductance 25 in diagonal 27 of the bridge circuit 16 as shown in the drawing. A second radiogoniometer B has a pair of fixed field windings one of which is composed of inductance 24 in the diagonal 9 of bridge circuit 15 the other field winding thereof being composed of inductance 26 in the diagonal 28 of bridge 16. Each of the goniometers A and B have movable search coil 29 and 30 respectively inductively coupled to the field coils of the goniometers A and B respectively, as shown in the drawing. An indicating device may be associated in any known manner with the search coil of each radiogoniometer.

In receiving signals according to this arrangement the receiver associated with one of the search coils as for instance 29, may be tuned to one of the signals to be received while the receiver coupled to the search coil 30 coupled to the other radiogoniometer may be tuned to signals at a different frequency which it is desired to receive. Tuning of the receiver associated with the first mentioned search coil which may be coupled closely to the field coils in the diagonals will not react through the bridge circuit to alter the tune of the receiver coupled to the other search coil because as pointed out above the diagonals are connected across nodal points of the bridge circuit and a voltage change in one diagonal may be made without affecting the voltage in the other diagonal. Likewise, the receiver associated with coil 30 may be tuned without altering the tune of the receiver associated with search coil 29.

By this arrangement a plurality of signals at different frequencies may be obtained without interference or cross talk between signals.

Although I have shown the bridge circuit as being applied only to a directive receiver or receivers operating on a loop aerial it will be understood that a sense of direction may be obtained in the receiver or receivers by the well known method of adding to the receiver input signal voltage from an open aerial effect which may be obtained by grounding the arrangement or by means of a separate vertical aerial.

I claim:

1. In a radio receiving system the combination of, a plurality of bridge circuits, a plurality of frame aerials each frame aerial being included in one arm of one of said bridge circuits, and a plurality of radio goniometers each operatively associated with each of said bridge circuits.

2. In radio apparatus in combination, a plurality of bridge circuits each having a directional aerial in one arm thereof, a plurality of radio goniometers each operatively associated with a diagonal of each bridge circuit, and an independent signalling circuit operatively associated with each radio goniometer.

3. The combination of, a plurality frame aerials, a plurality of radio frequency receiving circuits, and means including a Wheatstone bridge circuit operatively connecting each of said frame aerials with each of said receiving circuits to permit independent signalling in each receiving circuit.

4. The combination, a plurality of directional aerials, a plurality of radio goniometers each having a plurality of field coils and a search coil, means including a Wheatstone bridge circuit operatively associating a field coil of each of said radio goniometers with each of said aerials, and means for operatively associating a receiver circuit with each of said search coils.

5. The combination of a plurality of balanced bridge circuits each of which has a frame aerial in one arm thereof, a pair of diagonals connected across the nodal points of each of said bridge circuits, a plurality of radio goniometers the field windings of which consist of inductances in said diagonals, and a search coil operatively associated with each radio goniometer.

6. In radio receiving apparatus a plurality of balanced bridge circuits each having a frame aerial in one arm thereof, a plurality of radio goniometers each having a plurality of field coils a field coil of each radio goniometer being connected across a pair of nodal points of each of said bridge circuits, a search coil operatively associated with the field coils of each radio goniometer, and a receiver circuit operatively associated with each search coil.

7. In radio receiving apparatus, a pair of balanced bridge circuits each having an aerial in one arm thereof, a pair of radio goniometers each having a pair of field coils, one of the field coils of each of said pairs being connected across opposed pairs of nodal points of one of said bridge circuits, the other coil of each of said pairs being connected across opposed pairs of nodal points on the other of said bridge circuits a search coil operatively associated with each pair of field coils, and an indicating circuit operatively associated with each search coil.

8. In radio apparatus the combination of a pair of balanced bridge circuits each having a frame aerial in one arm thereof, a plurality of radio goniometers each having a pair of field coils, each pair of field coils being operatively associated with each frame aerial by means of diagonals across the nodal points of said bridge circuits, and a movable search coil coupled with each pair of field coils.

9. The combination of a pair of balanced bridge circuits each having a frame aerial in one arm thereof, a plurality of signalling circuits, and a plurality of radio goniometers coupling each of said signalling circuits through said bridge circuits to both of said frame aerials to permit independent signalling simultaneously in each of said signalling circuits.

10. In radio apparatus, a pair of bridge circuits, a frame aerial in one arm of each of said bridge circuits, the impedance ratio of adjacent arms of said bridge circuit being independent of frequency, a pair of diagonals connected across the nodal points of each of said bridge circuits, a pair of radio goniometers each including a pair of field windings each winding including an inductance in the diagonal of a different one of said bridge circuits, and a search coil operatively associated with each pair of field windings.

11. In radio apparatus in combination, two Wheatstone bridges, two radio goniometers, and two directional antenna, one field coil of each radio goniometer being operatively associated with one of a pair of conjugate arms of one of the bridges, the other field coils of the radio goniometers being operatively associated with a pair of conjugate arms of the other bridge, one directional antenna being operatively associated with a third arm of one bridge, and the other directional antenna being operatively associated with the other bridge.

WALTER van B. ROBERTS.